US012609113B2

(12) United States Patent
Phung et al.

(10) Patent No.: US 12,609,113 B2
(45) Date of Patent: Apr. 21, 2026

(54) NATURAL LANGUAGE PROCESSING SYSTEMS AND METHODS FOR INTENT CLASSIFICATION OF SPEECH TRANSCRIPTION

(71) Applicant: JPMorgan Chase Bank, N.A., New York, NY (US)

(72) Inventors: My Phung, Manhattan, NY (US); Harsh Saiprasad Deshpande, Santa Clara, CA (US); Ahmad Emami, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 188 days.

(21) Appl. No.: 18/535,521

(22) Filed: Dec. 11, 2023

(65) Prior Publication Data

US 2025/0191581 A1 Jun. 12, 2025

(51) Int. Cl.
G10L 15/18 (2013.01)
G10L 15/06 (2013.01)
G10L 15/14 (2006.01)

(52) U.S. Cl.
CPC ........ G10L 15/1815 (2013.01); G10L 15/063 (2013.01); G10L 15/14 (2013.01); *G10L 2015/0631* (2013.01)

(58) Field of Classification Search
CPC ........... G10L 15/063; G10L 2015/0631; G10L 2015/0635; G10L 2015/0638; G10L 15/10; G10L 15/14; G10L 15/18; G10L 15/1815

USPC ................................. 704/243, 244, 255, 257
See application file for complete search history.

(56) References Cited

U.S. PATENT DOCUMENTS

| | | | | |
|---|---|---|---|---|
| 2023/0086302 A1* | 3/2023 | Bhagavath | .............. | G10L 15/22 704/9 |
| 2023/0136527 A1* | 5/2023 | Zhang | ..................... | G06F 40/35 704/9 |
| 2023/0376700 A1* | 11/2023 | Bista | ........................ | G10L 15/22 |
| 2024/0013006 A1* | 1/2024 | Kumar | ................... | G06N 3/084 |
| 2024/0153484 A1* | 5/2024 | Rosenberg | ........... | G10L 13/047 |
| 2024/0304178 A1* | 9/2024 | Rosenberg | .......... | G06F 21/6254 |
| 2025/0095638 A1* | 3/2025 | Cho | ...................... | G10L 15/183 |

OTHER PUBLICATIONS

BarnabÃ², Giorgio, et al. "Supervised clustering loss for clustering-friendly sentence embeddings: An application to intent clustering." Findings of the Association for Computational Linguistics: IJCNLP-AACL 2023 (Findings). Nov. 2023, pp. 412-430. (Year: 2023).*

(Continued)

*Primary Examiner* — James S Wozniak
(74) *Attorney, Agent, or Firm* — Guntin & Gust, PLC; Miyoung Shin

(57) ABSTRACT

Aspects of the subject disclosure may include, for example, generating a natural language processing model by training an automatic speech recognition (ASR) encoder with manual transcription. The training is performed by correcting and adjusting relevant factors of the ASR encoder based on determined triplet loss, classification loss and Kullback-Leibler divergence loss. In response to an ASR utterance, the trained natural language processing model generates a predicted intent associated with the ASR utterance with improved accuracy. Other embodiments are disclosed.

20 Claims, 5 Drawing Sheets

(56) References Cited

OTHER PUBLICATIONS

Mesgar, Mohsen, et al. "The devil is in the details: on models and training regimes for few-shot intent classification." arXiv preprint arXiv:2210.06440. Oct. 2022, pp. 1-11. (Year: 2022).*

Kirandevraj, R. Open-Vocabulary Audio Keyword Spotting with Low Resource Language Adaptation. Diss. International Institute of Information Technology, Nov. 2022, pp. 1-46. (Year: 2022).*

Chen, Shuangshuang, and Wei Guo. "Auto-encoders in deep learningâa review with new perspectives." Mathematics 11.8, Apr. 2023, pp. 1-54. (Year: 2023).*

Agrawal, Bhuvan , et al., "Tie Your Embedding Down: Cross-Modal Latent Spaces for End-to-End Spoken Language Understanding", arXiv:2011.09044v2 [eess.AS], Apr. 15, 2021, 7 pgs.

Cha, Sujeong , et al., "Speak or Chat with Me: End-to-End Spoken Language Understanding System with Flexible Inputs", arXiv:214. 05752v2 [cs.CL], New York University, Jun. 13, 2021, 5 pgs.

Ruan, Weitong , et al., "Towards an ASR Error Robust Spoken Language Understanding System.", Proc. Interspeech, doi: 10.21437/ Interspeech.2020-2844, 2020, pp. 901-905.

* cited by examiner

100

200

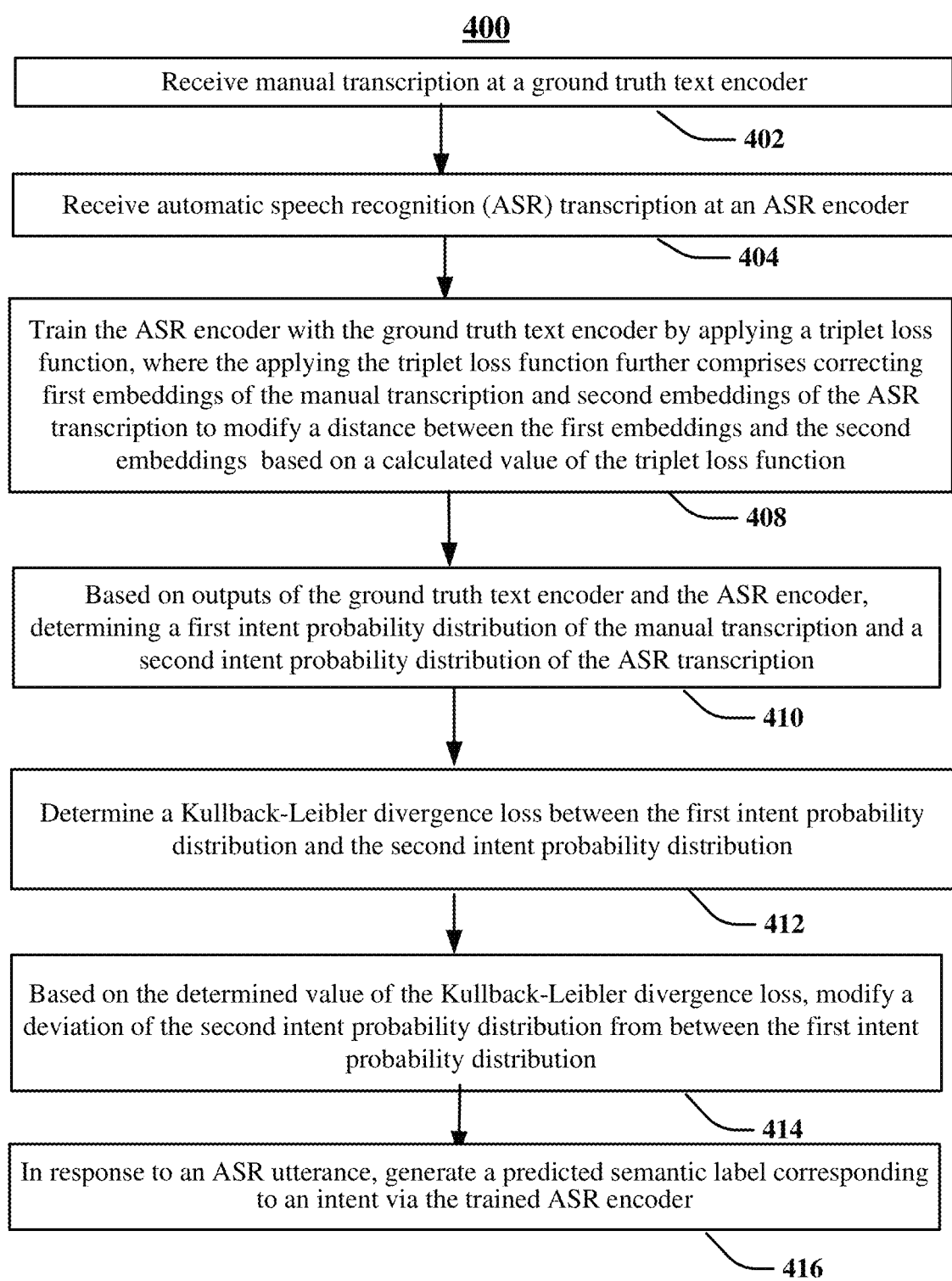

400

Receive manual transcription at a ground truth text encoder

— 402

Receive automatic speech recognition (ASR) transcription at an ASR encoder

— 404

Train the ASR encoder with the ground truth text encoder by applying a triplet loss function, where the applying the triplet loss function further comprises correcting first embeddings of the manual transcription and second embeddings of the ASR transcription to modify a distance between the first embeddings and the second embeddings based on a calculated value of the triplet loss function

— 408

Based on outputs of the ground truth text encoder and the ASR encoder, determining a first intent probability distribution of the manual transcription and a second intent probability distribution of the ASR transcription

— 410

Determine a Kullback-Leibler divergence loss between the first intent probability distribution and the second intent probability distribution

— 412

Based on the determined value of the Kullback-Leibler divergence loss, modify a deviation of the second intent probability distribution from between the first intent probability distribution

— 414

In response to an ASR utterance, generate a predicted semantic label corresponding to an intent via the trained ASR encoder

NATURAL LANGUAGE PROCESSING SYSTEMS AND METHODS FOR INTENT CLASSIFICATION OF SPEECH TRANSCRIPTION

FIELD OF THE DISCLOSURE

The subject disclosure relates to natural language processing systems and methods for determining an intent of speech transcription with improved accuracy.

BACKGROUND

Speech is considered as personally identifiable information. Regulatory or legal restrictions may be placed in analyzing and storing speech data. Accordingly, speech analytics may not be extracted directly from audio data and rather obtained through a pipeline. A pipeline spoken language understanding (SLU) system includes an automatic speech recognition (ASR) engine that converts speech signals into transcripts. The SLU system includes a natural language understanding (NLU) model to perform downstream analytics. The transcripts from the ASR engine may contain errors which may directly affect the NLU model.

BRIEF DESCRIPTION OF THE DRAWINGS

Reference will now be made to the accompanying drawings, which are not necessarily drawn to scale, and wherein:

FIG. 4 depicts an illustrative embodiment of a method in accordance with various aspects described herein.

DETAILED DESCRIPTION

Figure 1:
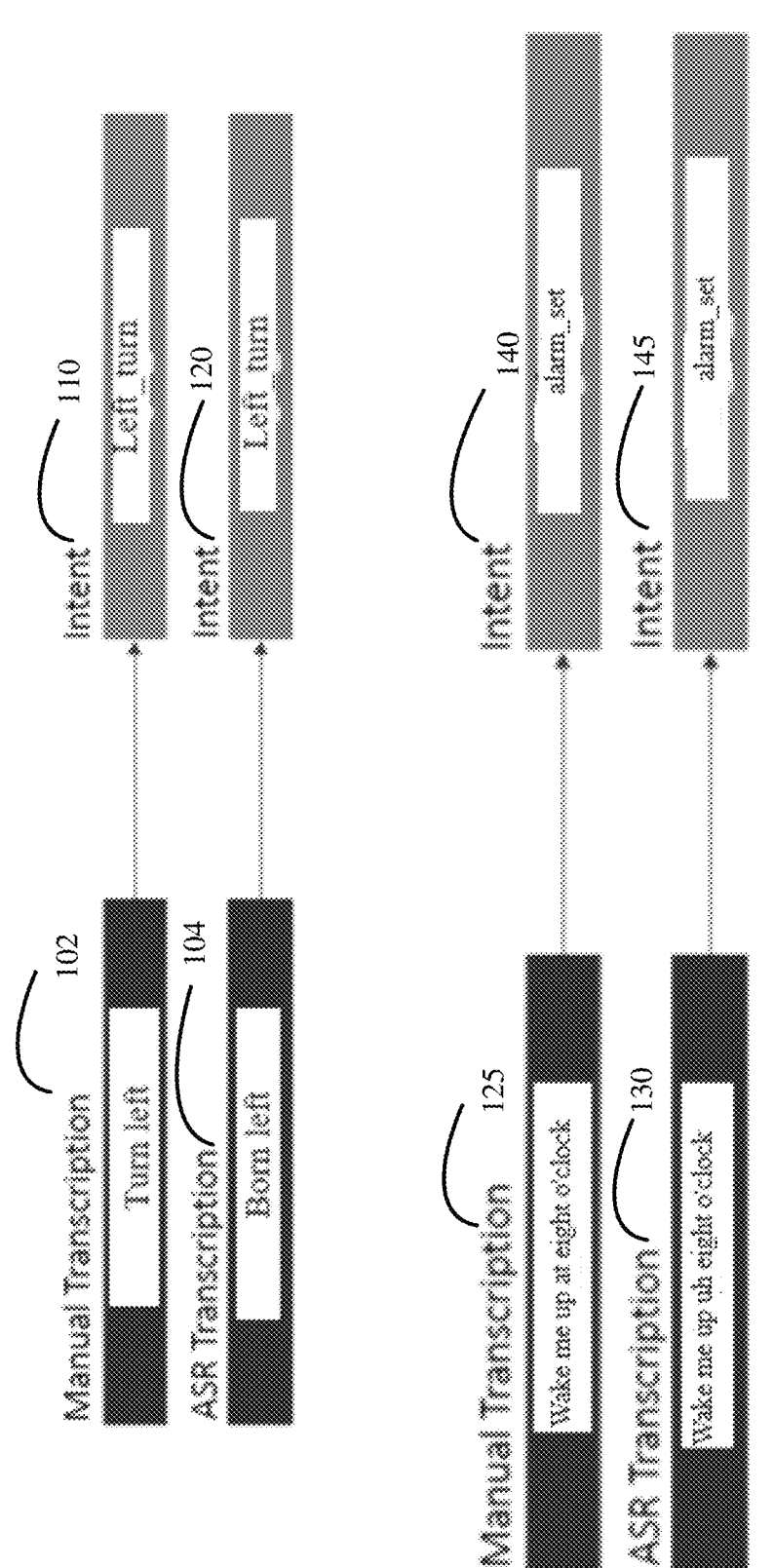
FIG. 1 depicts examples of manual transcription and ASR transcription and associated intents.

The subject disclosure describes, among other things, illustrative embodiments for natural language processing (NLP) systems and methods that include an encoder that learns from both ground truth transcription and automatic speech recognition (ASR) transcription, thereby closing a gap in an NLP model performance based on the ASR transcription and based on the ground truth transcription and determining an intent of a speaker with improved accuracy.

Other aspects of the subject disclosure further describe illustrative embodiments of generating a natural language processing model by training an automatic speech recognition (ASR) encoder with manual transcription. The training is performed by correcting and adjusting relevant factors of the ASR encoder based on determined triplet loss, classification loss and Kullback-Leibler divergence loss. In response to an ASR utterance as an input, the trained natural language processing model generates a predicted intent associated with the ASR utterance with improved accuracy. Other embodiments are described in the subject disclosure.

One or more aspects of the subject disclosure include a device including a processing system including a processor and a memory that stores executable instructions that, when executed by the processing system, facilitate performance of operations. The operations include receiving a first text input that represents gold transcripts at an encoder; receiving a second text input that represents Automatic Speech Recognition (ASR) transcripts at the encoder; performing first text embeddings of the first text input and second text embeddings of the second text input; determining, with an intent classifier, a first predicted intent probability distribution of the first text input and a second predicted intent probability distribution of the second text input; determining Kullback-Leibler divergence loss indicative of a statistical distance between the first predicted intent probability distribution and the second predicted intent probability distribution; training a natural language processing model including tying the first text embeddings and the second text embeddings by applying triplet loss in a common embedding space; based on a triplet loss value, correcting an output of the encoder; and, adjusting an output of the intent classifier and the output of the encoder based on the Kullback-Leibler divergence loss. The operations further comprise generating a first predicted intent resulting from the first text input and a second predicted intent resulting from the second text input, and in response to an ASR utterance, generating a predicted intent associated with the ASR utterance using the trained natural language processing model.

One or more aspects of the subject disclosure a non-transitory machine-readable medium, comprising executable instructions that, when executed by a processing system including a processor, facilitate performance of operations. The operations include receiving manual transcription at a ground truth text encoder; receiving automatic speech recognition (ASR) transcription at an ASR encoder; generating first embeddings of the manual transcription at the ground truth text encoder and second embeddings of the ASR transcription at the ASR encoder; training the ASR encoder with the ground truth text encoder by applying a triplet loss function, where the applying the triplet loss function further comprises correcting the first embeddings and the second embeddings to modify a distance between first embeddings of the manual transcription and second embeddings of the ASR transcription based on a calculated value of the triplet loss function; based on outputs of the ground truth text encoder and the ASR encoder, determining, a first intent probability distribution of the manual transcription and a second intent probability distribution of the ASR transcription; determining a Kullback-Leibler divergence loss between the first intent probability distribution and the second intent probability distribution; based on a value of the determined Kullback-Leibler divergence loss, modifying a deviation of the second intent probability distribution from the first intent probability distribution; and in response to an ASR utterance, generating a predicted semantic label corresponding to an intent via the trained ASR encoder.

One or more aspects of the subject disclosure are directed to a method including receiving, by a processing system including a processor, manual transcription at a ground truth text encoder; receiving, by the processing system, automatic speech recognition (ASR) transcription at an ASR encoder; generating, by the processing system, a natural language processing model by training the ASR encoder to learn from the text encoder. The training includes: using triplet loss, correcting first embeddings of the manual transcription and second embeddings of the ASR transcription to reduce a difference; based on the corrected first embeddings and second embeddings, determining a first predicted intent probability distribution of the manual transcription and a second predicted intent probability distribution of the ASR transcription; determining a classification loss indicative of a first difference between the first predicted intent probability distribution and an actual intent class of the manual transcription and a second difference between the second predicted intent probability distribution and an actual intent class of the ASR transcription; determining a Kullback-Leibler divergence loss between the first predicted intent probability distribution and the second predicted intent probability distribution; and based on the determined Kullback-Leibler divergence loss, correcting a gap between the first predicted intent probability distribution and the second predicted intent probability distribution; receiving, by the processing system, an ASR utterance; and generating, by the processing system, a predicted semantic label corresponding to an intent associated with the ASR utterance.

A spoken language understanding (SLU) system includes an automatic speech recognition (ASR) engine that converts speech signals into transcripts. The SLU system further includes a natural language understanding (NLU) model to perform downstream analytics. Applications of the SLU system include intent classification, keyword extraction, named entity recognition, sentimental analysis, etc. For an intent classification application, a speaker who provides an audio input to the ASR engine has a certain intent and the NLU model attempts to understand the intent in order to provide the most relevant response or take a relevant action.

FIG. 1 depicts examples of manual transcription and ASR transcription that are associated with the same intent. Manual transcription is also referred to as gold transcription or ground truth transcription. Manual transcription is manually transcribed to ensure the highest possible accuracy. Manual transcription serves as a reference object, when compared with the ASR transcription, and as the ASR transcription is more similar or closer to the manual transcription, the ASR transcription can be considered as more accurate.

In FIG. 1, manual transcription 102 includes "Turn left" and the associated intent 110 is "Left_turn." ASR transcription 104 is "Born left," which contains an error, but the associated intent 120 is identical to the intent 110, "Left_turn."

The error contained in the transcripts from the ASR engine will likely directly affect the NLU model that performs downstream analytics.

As another example, manual transcription 125 is "Wake me up at eight o'clock" and the associated intent 140 is "alarm_set." ASR transcription 130 is "Wake me up uh eight o'clock" and the associated intent 145 is "alarm_set." The ASR transcription 130 contains an error or an unclear utterance which may affect the NLU model that performs downstream analytics.

For keyword extraction or named entity recognition, a user types a query or question in natural language and searches the Internet. For instance, a user's query is "where was Obama born?" Alternatively, a user speaks a query, "where was Obama born?" The NLU model can extract keyword or recognize named entity (i.e., Obama). As further another example, sentiment analysis is another application of NLP which tries to understand sentiment of speakers, users, customers, etc. (e.g., opinions and stances) through NLP on web, social media, other online sources, etc.

Compared to textual language, spoken language is less structured and more challenging to process than textual language or written language, because of speech overlapping, filler words, interruptions, etc. Moreover, speech can be considered as personally identifiable information and there are relevant regulatory or legal requirements and/or restrictions in analyzing and storing speech as data. Accordingly, speech data or audio data may not be readily available for training the ASR engine and the NLP systems. In addition, compared to the manual transcription, ASR transcripts may contain more noise and be prone to errors.

The present disclosure is directed to a framework that can leverage an encoder or encoders to learn from both manual or ground truth transcription (i.e., gold transcription) and ASR transcription. The present disclosure does not involve audio data or speech files in order to train text encoders. Additionally, the framework described in the present disclosure does not train an audio encoder based on text transcription or ground truth transcription. The framework described in the present disclosure may close a gap in performances of the NLP systems based on ASR transcripts and ground truth transcripts.

In some embodiments, the framework described in the present disclosure may use, for result benchmarking, a data set that is available in the pertinent field, such as Spoken Language Understanding Resource Package (SLURP) by way of example. See Emanuele Bastianelli, et al., "SLURP: A Spoken Language Understanding Resource Package," arXiv:2011.13205v1 [cs.CL] (Nov. 26, 2020). SLURP is a publicly available dataset for an end to end speech language understanding system and considered as one of the most acoustically challenging datasets for intent classification tasks. Id. The present disclosure is not limited to using SLURP and other publicly available datasets or custom generated datasets can be used for result benchmarking.

To obtain the ASR transcription, a currently available ASR engine can be used. The present disclosure is not limited to a particular ASR engine. In some embodiments, a baseline NLP system includes a single encoder and a single classification layer. The baseline NLP system, upon training with gold transcripts only, or ASR transcripts only, can predict an intent of a user input with different accuracy levels. For instance, the baseline NLP system is configured to generate a predicted intent based on gold transcripts input upon training with a gold transcript evaluation set or an ASR transcript evaluation set. As another example, the baseline NLP system is configured to generate a predicted intent based on ASR transcripts input using training with the gold transcript evaluation set or the ASR transcript evaluation set. The baseline NLP system tends to produce more accurate results on the gold transcript evaluation set when the gold transcript training set is used for training, for example, by 8-13 points, as compared to its performance on the ASR evaluation set. The baseline NLP system shows lower accuracy on the gold transcript evaluation set when trained with the ASR transcript evaluation set but shows higher accuracy with respect to the ASR evaluation set. It is desirable to close such gaps in performance of the baseline NLP system because, after the training phase and at an inference phase, the ASR transcripts are the only input to the baseline NLP system.

Figure 2:
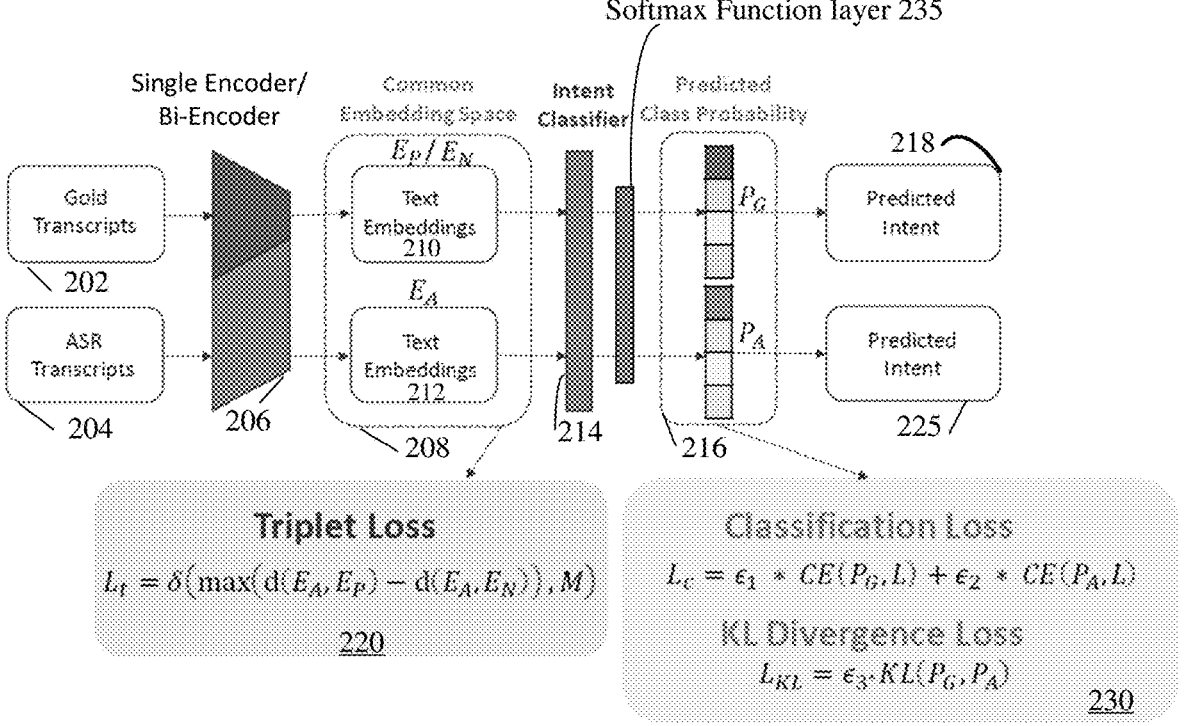
FIG. 2 is a block diagram illustrating an exemplary, non-limiting embodiment of a natural language processing system in accordance with various aspects described herein.

FIG. 2 is a block diagram illustrating an exemplary, non-limiting embodiment of a natural language processing system in accordance with various aspects described herein. The natural language processing (NLP) system 200 includes gold transcripts 202 and ASR transcripts 204 as input to an encoder 206. The NLP system 200 further includes a common embedding space 208, an intent classifier 214, a softmax function layer 235, and predicted class probability determination space 216. The NPL system 200 generates predicted intent 218, 225 as an output.

In various embodiments, the gold transcripts 202 correspond to ground truth transcripts which is manually transcribed to ensure the highest possible accuracy. The gold transcripts 202 are constructed from manual transcription. The ASR transcripts 204 are converted from speech data or audio data by an ASR engine and for that reason, the ASR transcripts 204 may have more errors than the gold transcripts 202. In some embodiments, the NLP system 200 performs an intent classification task with a machine learning algorithm based on the ASR transcripts 204. As depicted in FIG. 1, the NLP system 200 classifies a speaker's intent from a speech command. In order to perform the intent classification task, the NPL system 200 includes the encoder 206 which is trained with both the gold transcripts 202 and the ASR transcripts 204.

In some embodiments, a single text encoder 206 is used, in the single-encoder setup, to produce embeddings for inputs coming from both ASR and gold transcript streams. During training, the weights for this single encoder 206 will be updated.

In other embodiments, bi-encoder models include two encoders, i.e., an ASR text encoder and a gold transcription or ground truth text encoder. In the bi-encoder model, the ASR text encoder and the gold transcription text encoder are kept separate and at the training phase, weights on the gold transcription text encoder are set to be fixed or freeze and only the ASR text encoder is subject to training, i.e., to configure the ASR text encoder to learn from the gold transcription text encoder.

In some embodiments, the single encoder model can be implemented with a pre-trained BERT (Bidirectional Encoder Representations from Transformers) encoder. The BERT encoder reads input sequences and processes them. The BERT encoder reads the entire sentence and attention layers learn the context of a word from left and right surrounding words. The BERT encoder is pre-trained on an unlabeled dataset using masked language model (MLM) and next sentence prediction methods. The BERT encoder input sentences and performs input embeddings such as token embeddings, segment embeddings and position embeddings. The BERT encoder transfers all parameters of pre-training to initialize models for different downstream tasks. The BERT encoder can be fine-tuned to be customized with a particular downstream task. Input and output datasets specific to the particular downstream task can be inputted to the BERT encoder and all the parameters are modified. The output of the BERT encoder is provided to a feed-forward neural network and a softmax function which generates a result, such as a predicted intent, a sentimental analysis, etc. The present disclosure is not limited to the BERT encoder and other forms of text encoders can be used.

Referring back to FIG. 2, the encoder 206 is configured to receive the gold transcripts 202 and the ASR transcripts 204 and perform input embeddings such as token, segment and/or position embeddings. The gold transcripts 202 and the ASR transcripts 204 that have been processed with the input embeddings are passed to the common embedding space 208.

In various embodiments, in the common embedding space 208, a tying process of text embeddings 210 from the gold transcripts 202 and text embeddings 212 from the ASR transcripts 204 is performed. Tying the gold transcripts text embeddings 210 to the ASR transcripts text embeddings 212 enables the encoder 206 to learn from both the ground truth transcription (i.e., the gold transcription) and the ASR transcription. In some embodiments, the encoder 206 can be implemented with bi-encoders including an ASR encoder and a pre-trained ground truth or gold transcription text encoder. By tying the gold transcripts text embeddings 210 to the ASR transcripts text embeddings 212, the ASR encoder can be trained by using the pre-trained gold transcription text encoder which involves the gold transcripts 202.

In various embodiments, the tying of the gold transcripts text embeddings 210 to the ASR transcripts text embeddings 212 is performed by using triplet loss. Triplet loss is used to teach a machine-learning model to recognize similarity or differences between items. More specifically, triplet loss uses a group of three items, i.e., triplets, which includes an anchor item, a positive item (similar item), and a negative item (different item). Triplet loss enforces a distance between a pair of samples with the same labels to be smaller than a distance between a pair of samples with different labels.

In the common embedding space 208, triplet loss is applied by setting samples from the text embeddings 212 of the ASR transcripts as anchor items and set samples from the text embeddings 210 of the gold transcripts 202 as positive items and negative items. Using the examples depicted in FIG. 1, a first sample utterance, "Born left" is set as an anchor item, a second sample utterance, "Destination is on your left" is set as a positive item, and a third sample utterance, "Look left" as a negative item. The intent of "Born left" is left_turn and the second sample utterance, "Destination is on your left" shares the same intent, "left_turn." However, the third sample utterance, "Look left" may not have the same intent, "left_turn" and rather conveys a different intent.

By applying the triplet loss, the distance between the first sample utterance and the second sample utterance, which shares the same intent, is minimized and a distance between the first sample utterance and the third sample utterance, is maximized, even though the first sample utterance and the third sample utterance are acoustically close. Triplet loss is computed by using the following Equation 1:

$$L_t = \delta(\max(d(E_A, E_P) - d(E_A, E_N)), M) \qquad \text{Equation (1)}$$

In Equation (1), $E_A$ is an embedding of an anchor item, $E_P$ is an embedding of a positive item, $E_N$ is an embedding of a negative item. In order to train the NLP system 200 accordingly, for each ASR embedding $E_A$, two embeddings $E_P$, $E_N$ are sampled.

Based on Equation (1), the loss is modeled as $d(E_A, E_P) - d(E_A, E_N)$ such that $d(E_A, E_P)$ is reduced while $d(E_A, E_N)$ is increased. Training based on Equation (1) may lead to a very large negative loss value which is desirable but can lead to unstable training. Thus, the loss is generally capped to a minimum limit which is defined as a margin M. In various embodiments, different values for M can be selected and applied to Equation (1) in order to check and determine an optimal value for M.

As described above, by applying triplet loss, the encoder 206 is trained to predict embeddings so that embeddings of utterances of the same intent class are closer to each other than utterances of different intent classes. In other words, the distance between two embeddings of the same intent class is reduced.

In various embodiments, the triplet loss may serve as a corrective process when the ASR transcript embeddings are far from the gold transcript embeddings. For instance, if the two embeddings may be too far, the calculated triplet loss is a large value, which results in both the gold and ASR embeddings being corrected to bring them closer. Based on the calculated triplet loss, weights of the encoder 206 can be affected as described above such that embeddings of utterances of the same intent class are closer to each other than utterances of different intent classes.

As depicted in FIG. 2, the encoder 206 provides an output to the intent classifier 214 after completing the corrective process based on the triplet loss. In various embodiments, the intent classifier 214 is a network shared for the gold transcripts 202 and the ASR transcripts 204 and followed by a softmax function layer which predicts intent. In some embodiments, the intent classifier 214 includes an input size that corresponds to the size of text embeddings and an output size depending on a number of intent classes that the intent classifier 214 needs to predict. More specifically, the common embedding space 208 provides a vector of length 'n' for each input utterance. The intent classifier 214 takes this n length vector, passes the n length vector through a fully connected (n×n) layer, and then through another (n×k) fully connected layer to get intent logits, which is now a k length vector, one logit for each intent class. Here, 'k' represents a number of possible intent classes. These logits are then passed through the softmax function layer to get intent probability which is again a 'k' length vector, i.e., a probability assigned for each of the intent classes. The logits correspond to a logit function that represents probability values from 0 to 1 along the X-axis. In other words, the output of the intent classifier 214 and the softmax function layer 235 include predicted intent probability distributions for each intent class as to the gold transcripts 202 and the ASR transcripts 204.

In various embodiments, the NLP system 200 is further configured to calculate classification loss. The classification loss is the way that the intent classifier 214 is trained to predict a correct intent class. One example of the classification loss is cross-entropy loss. The cross-entropy loss indicates that the predicted intent probability distribution (i.e., the output of the intent classifier 214 and the softmax layer 235) is pushed towards predicting a probability of "1" for the ground truth label and a probability of "0" for the others. It is denoted as CE ($P_A$, $I_A$), where the parameter $P_A$ represents the predicted intent probability distribution for an utterance of the gold utterance, and the parameter $I_A$ represents an associated intent class. The classification loss is computed with Equation 2:

$$L_C = \epsilon_1 * CE(P_G, L) + \epsilon_2 * CE(P_A, L) \qquad \text{Equation 2}$$

where $L_C$ denotes the classification loss, CE ($P_G$, L) denotes the predicted intent probability distribution of the gold transcripts 202, the parameter L represents the actual intent class of the utterance, for instance, as marked by annotators with respect to the ground truth. Accordingly, CE ($P_G$, L) denotes classification loss for the predicted intent probability distribution of the gold transcripts 202 with respect to the actual intent class, and CE ($P_A$, L) denotes classification loss for the predicted intent probability distribution of the ASR transcripts 204 with respect to the actual intent class. Parameters $\epsilon_1$, $\epsilon_2$ represent different weights that can be assigned to the loss terms, depending on how much correction may be needed or intended as to the predictions from the ASR or gold transcription streams.

Referring back to FIG. 2, with respect to the predicted intent probability distributions, Kullback-Leibler divergence loss is applied to determine the KL distance between the predicted intent probability distribution of the gold transcripts 202 and the predicted intent probability distribution of the ASR transcripts 204. Kullback-Leibler divergence loss provides meaningful information as to whether a predicted intent class of the ASR transcripts 204 is the same or similar to a predicted intent class of the gold transcripts 202. Kullback-Leibler divergence loss is calculated with Equation 3:

$$L_{KL} = \epsilon_3 * KL(P_A, P_G) \qquad \text{Equation 3}$$

where $L_{KL}$ denotes Kullback-Leibler divergence loss, $\epsilon_3$ denotes a parameter that varies with a particular model, and KL ($P_A$, $P_G$) denotes the KL distance between each predicted probability distribution $P_G$, $P_A$ of the gold transcripts 202 and the ASR transcripts 204.

When compared to the definition of the Kullback-Leibler divergence loss (KL(P, Q)), $P_G$ corresponds to P and $P_A$ corresponds to Q and KL($P_G$, $P_A$)) represents the difference between the two predicted probability distributions, $P_G$, $P_A$. In various embodiments, the Kullback-Leibler divergence loss ensures that the predicted ASR intent probability distribution is same or as close as possible to that of the gold transcripts. If the two distributions are far apart, the Kullback-Leibler divergence loss has a higher magnitude and the predicted intent probability distributions for both streams are corrected to reduce a gap therebetween. The Kullback-Leibler divergence loss corrections affect the weights of both the intent classifier and the text encoder. Thus, the calculated Kullback-Leibler divergence loss enables the NLP system 200 to learn the same intent for the ASR transcripts 204, regardless of text being error free or having ASR errors.

The NLP system 200 generates the output of the predicted intent 218 as to the gold transcripts 202 and the predicted intent 225 of the ASR transcripts 204. At the training phase, the encoder 206 is configured to receive the gold transcripts 202 and the ASR transcripts 204 and generate the predicted intent 218, 224 as an output. In the single encoder setting, the single encoder is used at both training and inference. In other words, at an inference phase, only ASR utterances are input to the encoder 206 and the predicted intent 225 is generated as an output using the trained NLP system 200. In the bi-encoder setting, the pre-trained text encoder for the gold transcripts 202 may not be activated or used at the inference phase.

In some embodiments, the NLP system 200 may achieve improved accuracy on the ASR transcription. For instance, the NLP system 200 may improve the accuracy on the ASR transcription by 3-4% higher than baseline NLP models using the ASR transcription without using the gold standard transcription during the training phase. Additionally, the NLP system 200 may outperform the baseline NLP models using the ASR transcription when word error rates (WERs) are higher than 5%.

In some embodiments, the NLP system 200 may not require any kind of speech audio data at training or inference stages. Instead, the gold transcription and the ASR transcription inputs are used during the training stage and the ASR transcription is used at the inference stage. This is advantageous as the ASR transcription is accessible in real time use cases, easily accessible and stored, and can be augmented with personally identifiable information removal strategies. Moreover, the NLP system 200 is further highly advantageous for use cases in financial institutions, where access and storage of speech audio data is limited as personally identifiable information.

In some embodiments, the NLP system 200 is implemented in a processing system that includes a processor and a memory. The memory stores executable instructions that, when executed by the processing system, facilitate performance of operations including training the ASR encoder with the text encoder or training the encoder based on the gold transcripts and the ASR transcripts, by tying the embeddings of the gold or manual transcription to the embeddings of the ASR transcription, via triplet loss, and by tying the predicted intent class probability distributions coming from the two streams of the transcripts, via Kullback-Leibler divergence loss. The NLP system 200 can outperform the currently available models including the baseline models which may not perform the above-described training based on triplet loss and Kullback-Leibler divergence loss.

In some embodiments, the NLP system 200 implements the intent detection model which takes the text embeddings as input and predicts a probability distribution over possible intent classes. The NLP system 200 uses a neural network with two fully connected layers separately by an activation layer. The present disclosure is not limited to the described architecture and other choices of text encoders and classifiers are also available.

Figure 3:
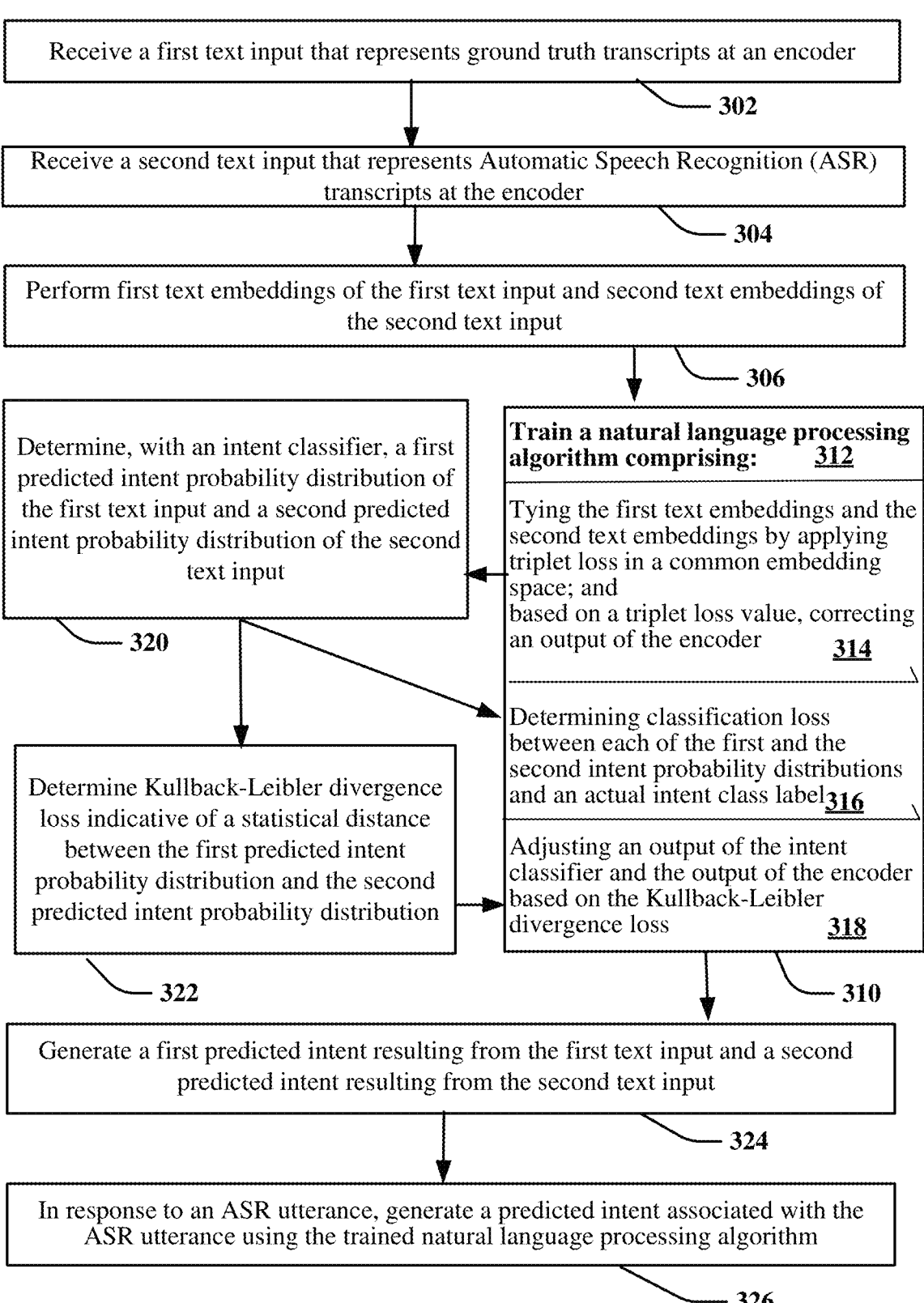
FIG. 3 depicts an illustrative embodiment of a method in accordance with various aspects described herein.

FIG. 3 depicts an illustrative embodiment of a method in accordance with various aspects described herein. The method 300 is directed to generating a natural language processing model by training an ASR encoder with a ground truth text encoder. Additionally or alternatively, a single encoder can be used and trained with both ground truth or gold transcripts and ASR transcripts. In various embodiments, the method 300 includes receiving a first text input that represents gold transcripts or manual transcription at an encoder (Step 302) and receiving a second text input that represents automatic speech recognition (ASR) transcription at the encoder (Step 304). The ground truth or gold transcripts, i.e., manual transcription, is obtained by having annotators listen to the audio recording and correct errors in the ASR transcription. The ASR transcription can be obtained by an ASR engines available in the art. In some embodiments, the encoder can be implemented as bi-encoders. Alternatively, the encoder can be implemented as a single encoder. The method 300 further includes performing first text embeddings of the first text input and second text embeddings of the second text input (Step 306).

The method 300 proceeds to training (Step 310). The training (Step 310) includes tying first embeddings of the gold transcripts to second embeddings of the ASR transcripts by applying triplet loss (Step 314). In various embodiments, the tying of the first embeddings to the second embeddings via triplet loss (Step 314) includes setting, as an anchor item, a first sample of the first embeddings directed to a first intent class in the ASR transcription, setting, as a positive item, a second sample embedding directed to the same intent class, and setting, as a negative item, a third sample embedding directed to a second intent class substantially different from the first intent. The following example demonstrates an input triplet:

T={A, G} denotes a set of transcription, ASR(A) and Gold (G).

I={0, 1, 2} denotes a set of intent labels.

O={An=($T_A$, $I_0$), Positive=($T_G$, $I_0$), Negative=($T_G$, $I_1$)} denotes an input triplet of an anchor, where "An" represents ASR transcripts with intent label 0, "Positive" represents the gold transcription of the same utterance with the same intent class, label 0, and "Negative" represents the gold transcription of a different utterance from a different intent class, label 1).

At training time, a negative example will be chosen at random from a different intent class.

In the triplet loss training step (Step 314), similarity or a difference between the anchor item and the positive and negative items, is computed as a triplet loss value and used to correct the output of the encoder. By way of example, weights of the encoder are modified or corrected based on the triplet loss value. The triplet loss is a corrective process to be taken if the ASR transcript embedding is far from the gold transcript embedding. If the two embeddings are far, the calculated triplet loss is a large value, which results in both the gold and ASR embeddings being corrected to get them closer. The triplet loss has no effect on the intent classifier. It only affects the weights of the encoder.

The corrected embeddings based on the triplet loss value (Step 314) are reflected in an output of the encoder which is provided to an intent classifier. The intent classifier and a softmax function layer arranged at the end of the intent classifier determines a first intent probability distribution corresponding to the gold transcripts and a second intent probability distribution corresponding to the ASR transcripts. (Step 320).

The method 300 further includes determining classification loss between the first intent probability distribution corresponding to the gold transcripts and an actual intent class label and classification loss between the second intent probability distribution corresponding to the ASR transcripts and the actual intent class label (Step 316). The classification loss is the way that the intent classifier is trained to predict a correct intent class.

The method 300 further includes determining a Kullback-Leibler divergence loss between the first intent probability distribution and the second intent probability distribution (Step 322). The Kullback-Leibler divergence loss ensures that the predicted ASR intent distribution is the same or as close as possible to that of the gold transcripts. If the two distributions are far apart, the Kullback-Leibler divergence loss has higher magnitude and the predicted intent distributions for both streams are corrected to reduce the gap between them. Based on the determined Kullback-Leibler divergence loss, the method 300 further includes correcting weights of both the intent classifier and the encoder (Step 318). The method 300 includes generating a first predicted intent resulting from a first text input stream and a second predicted intent resulting from a second text input stream (Step 324).

The steps discussed above are directed to generating the NLP algorithm by training based on the triplet loss, the classification loss and the Kullback-Leibler divergence loss. At an inference stage, an ASR utterance is received and in response to the ASR utterance, a predicted intent associated with the ASR utterance is generated using the trained NLP algorithm (Step 326). At the inference phase, there is only one input stream, the ASR transcription. At the training phase, there are two input streams, the ASR transcription and the gold standard, manual transcription.

In some embodiments, the method 300 may use for result benchmarking data set that is available in the pertinent field, such as SLURP (2020) by way of example. SLURP is considered as one of the most acoustically challenging datasets for intent classification tasks. The SLURP dataset can come with audio, gold transcription and intent labels in 18 domains for speech commands. To obtain the ASR transcription, a currently available ASR engine can be used.

Baseline models include a simple text encoder trained on either the ASR transcription or the gold transcription, or both data with only classification loss. Compared to the baseline models, the method 300 may provide an NLP system that achieve a 5-point gain in accuracy than the conventional models. Additionally, the method 300 does not use or involve audio input and instead, uses text inputs and text encoders. By way of example only, Table 1 below illustrates non-limiting exemplary accuracy results of the baseline models and the embodiments at different word error rates (WERs). As shown in Table 1 below, the present embodiments using the method 300 perform better than the baseline models trained on the ground truth transcription, especially at high word error rates, indicating that the method 300 may produce better results, even when the quality of ASR transcription is poor. The method 300 may be suitable for use cases where utterances involve or use difficult terms, professional terms, such as financial terms and products. Using the method 300, NLU/NLP models can extract better analytics from the ASR transcription, which is applicable for all speech use cases, and can be effectively integrated into current speech engineering pipelines.

TABLE 1

| Comparison of Performance Between Baseline Models and Embodiments | | | |
|---|---|---|---|
| Word Error Rate (WER) | Baseline Performance | Performance of Present Embodiments | Difference |
| 0 | 85.81 | 85.65 | −0.16 |
| 5 | 83.51 | 84.29 | +0.78 |
| 8 | 81.19 | 82.82 | +1.63 |
| 13 | 78.78 | 81.13 | +2.35 |
| 17 | 76.67 | 79.82 | +3.15 |
| 22 | 74.16 | 78.05 | +3.89 |

FIG. 4 depicts an illustrative embodiment of another method in accordance with various aspects described herein. In various embodiments, the method 400 includes receiving manual transcription at a ground truth or gold transcription text encoder (Step 402), and receiving ASR transcripts at an ASR encoder (Step 404). The ground truth or gold transcription text encoder is configured to predict first embeddings of the manual transcription and the ASR encoder is configured to predict second embeddings of the ASR transcription. The ASR encoder is further configured to be trained with the ground truth or gold transcription text encoder by tying the first text embeddings and the second text embeddings via a triplet loss function in a common embedding space (Step 408). In various embodiments, the applying the triplet loss function further includes correcting first embeddings of the manual transcription and second embeddings of the ASR transcription to modify a distance (e.g., increase or reduce the distance) between the first embeddings and the second embeddings based on a calculated value of the triplet loss function (Step 408).

The method 400 includes, based on outputs of the text encoder and the ASR encoder, determining a first intent probability distribution of the manual transcription and a second intent probability distribution of the ASR transcription (Step 410). The intent classifier takes an n length vector from the common embedding space, passes the n length vector through a fully connected (n×n) layer, and then through another (n×k) fully connected layer to get intent logits, which is now a k length vector, one logit for each intent class. Here, 'k' represents a number of possible intent classes. These logits are then passed through the softmax function layer to get intent probability which is again a 'k' length vector, i.e., a probability assigned for each of the intent classes. In other words, the output of the intent classifier and the softmax function layer include predicted intent probability distributions for each intent class as to the manual transcription and the ASR transcription.

A Kullback-Leibler divergence loss is determined between the first intent probability distribution of the manual transcription and the second intent probability distribution of the ASR transcription (Step 412). Based on the determined value of the Kullback-Leibler divergence loss, a deviation between the first intent probability distribution and the second intent probability distribution is modified (Step 414).

As a result, the method 400 further includes, in response to an ASR utterance, generating a predicted semantic label corresponding to an intent via the trained ASR encoder (Step 416).

While for purposes of simplicity of explanation, the respective processes are shown and described as a series of blocks in FIGS. 3-4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The above described embodiments have several applications, including intent classification and sentiment analysis. One use case includes adopting the intent classification for detecting a trader's intent in a sales call and in this use case, intent classes can include inquiry, trade, non-trade, etc. For other use cases, a use case specific dataset, where labels are the classes of interest, may be generated and the method 400 trains and evaluates the encoders on such dataset.

Figure 5:
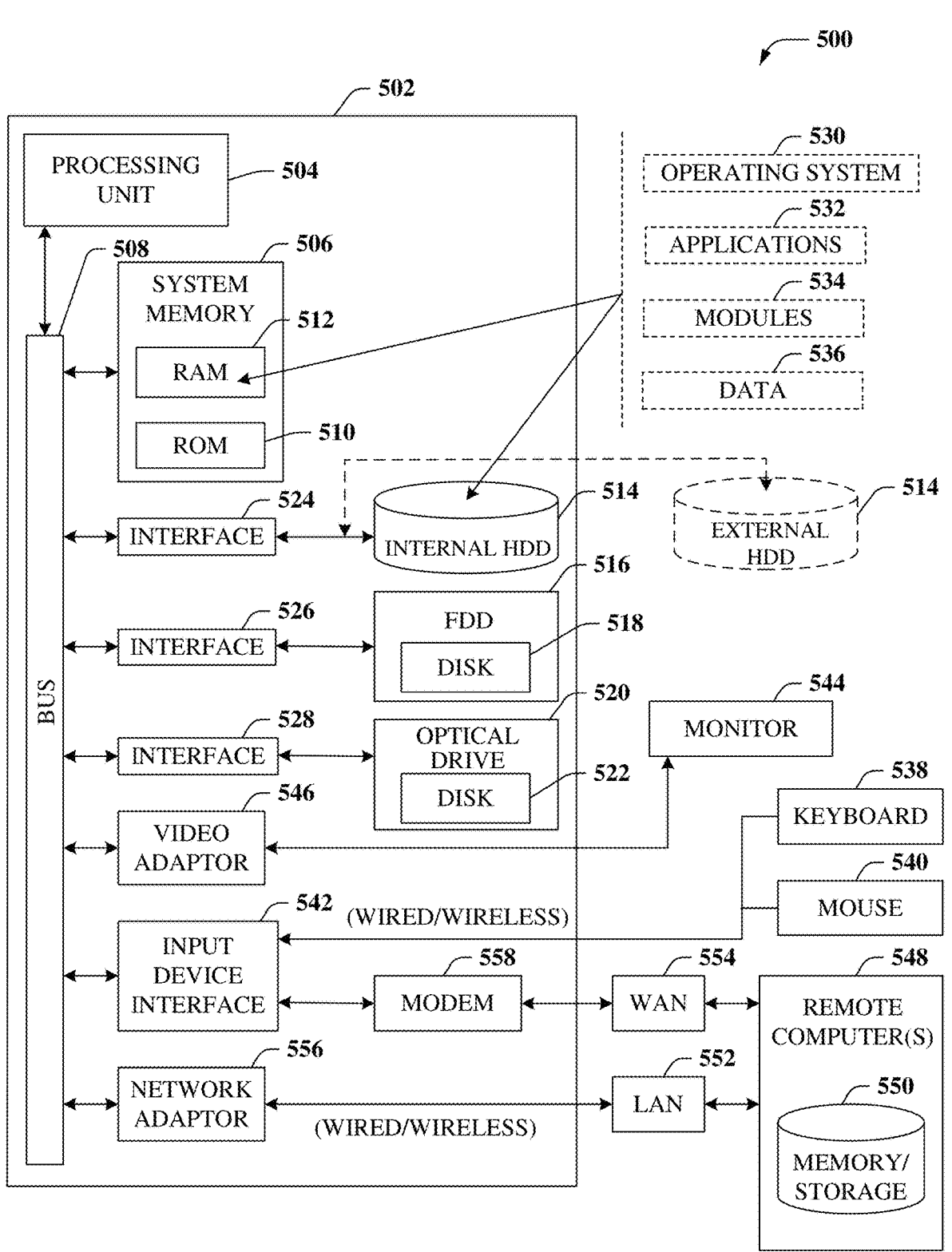
FIG. 5 is a block diagram of an example, non-limiting embodiment of a computing environment in accordance with various aspects described herein.

FIG. 5 is a block diagram of an example, non-limiting embodiment of a computing environment in accordance with various aspects described herein.

In order to provide additional context for various embodiments of the embodiments described herein, FIG. 5 and the following discussion are intended to provide a brief, general description of a suitable computing environment 500 in which the various embodiments of the subject disclosure can be implemented. For example, computing environment 500 can facilitate in whole or in part natural language processing systems and methods that train the ASR transcription based on the manual transcription via triplet loss and Kullback-Leibler divergence loss.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high-capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 408 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

with respect to ground truth transcripts, at a first portion of an encoder:

receiving a first text input that represents ground truth transcripts;

performing first text embeddings of the first text input;

determining, with an intent classifier, a first predicted intent probability distribution of the first text input; and generating a first predicted intent for the ground truth transcripts;

with respect to Automatic Speech Recognition (ASR) transcripts, at a second portion of the encoder:

receiving a second text input that represents the ASR transcripts;

performing second text embeddings of the second text input;

training a natural language processing model for determining a second predicted intent for the ASR transcripts by training the second portion of the encoder to learn from the ground truth transcripts, wherein the training the second portion of the encoder comprises:

tying the first text embeddings and the second text embeddings by applying a triplet loss in a common embedding space;

based on a triplet loss value, correcting an output of the second portion of the encoder;

determining, with the intent classifier, based on the corrected output, a second predicted intent probability distribution of the second text input;

determining a classification loss indicative of a difference between the second predicted intent probability distribution and an actual intent class of the ASR transcripts;

determining a Kullback-Leibler divergence loss between the first predicted intent probability distribution and the second predicted intent probability distribution;

based on a value of the determined Kullback-Leibler divergence loss, modifying a deviation of the second predicted intent probability distribution from the first predicted intent probability distribution; and following the modification of the deviation, generating a second predicted intent resulting from the second text input; and in response to an ASR utterance, generating a predicted intent associated with the ASR utterance using the trained natural language processing model.

2. The device of claim 1, wherein the determining the Kullback-Leibler divergence loss further comprises determining the Kullback-Leibler divergence loss indicative of a statistical distance between the first predicted intent probability distribution and the second predicted intent probability distribution.

3. The device of claim 2, wherein the training the natural language processing model further comprises adjusting an output of the intent classifier and the output of the second portion of the encoder based on the Kullback-Leibler divergence loss with respect to the ASR transcripts.

4. The device of claim 3, wherein the operations further comprise determining combined loss functions including the triplet loss, the Kullback-Leibler divergence loss, and the classification loss.

5. The device of claim 1, wherein a single encoder comprises the first portion of the encoder to receive the first text input and the second portion of the encoder to receive the second text input as a pair of data.

6. The device of claim 1, wherein bi-encoders comprise the first portion of the encoder that receives the first text input and the second portion of the encoder that receives the second text input, respectively.

7. The device of claim 1, wherein the tying the first text embeddings and the second text embeddings by applying triplet loss further comprises determining a first distance between the second text embeddings and a positive sample embedding, wherein the second text embeddings and the positive sample embedding are associated with a same intent class.

8. The device of claim 7 wherein the tying the first text embeddings and the second text embeddings by applying triplet loss further comprises determining a second distance between the second text embeddings and a negative sample embedding, wherein the second text embeddings and the negative sample embedding are associated with different intent classes, respectively.

9. The device of claim 8, wherein the correcting the output of the second portion of the encoder further comprises training the second portion of the encoder to reduce the first distance and increase the second distance.

10. The device of claim 8, wherein the correcting the output of the second portion of the encoder further comprises correcting the second text embeddings based on the first distance and the second distance.

11. A non-transitory machine-readable medium, comprising executable instructions that, when executed by a processing system including a processor, facilitate performance of operations, the operations comprising:

receiving a manual transcription at a ground truth text encoder;

receiving automatic speech recognition (ASR) transcription at an ASR encoder;

generating first embeddings of the manual transcription at the ground truth text encoder and second embeddings of the ASR transcription at the ASR encoder;

training the ASR encoder with the ground truth text encoder by applying a triplet loss function, resulting in a trained ASR encoder, wherein the applying the triplet loss function further comprises correcting the second embeddings to modify a distance between first embeddings and second embeddings based on a calculated value of the triplet loss function;

based on an output of the ground truth text encoder and an output of the ASR encoder based on the corrected second embeddings, respectively, determining, a first intent probability distribution of the manual transcription and a second intent probability distribution of the ASR transcription;

applying a classification loss function to determine a difference between an actual intent class and a predicted intent class for the second intent probability distribution of the ASR transcription;

determining a Kullback-Leibler divergence loss between a predicted intent class for the manual transcription and the predicted intent class for the ASR transcription in connection with the first intent probability distribution and the second intent probability distribution; and based on a value of the determined Kullback-Leibler divergence loss, modifying a deviation of the second intent probability distribution from the first intent probability distribution; and in response to an ASR utterance, generating a predicted semantic label corresponding to an intent via the trained ASR encoder.

12. The non-transitory machine-readable medium of claim 11, wherein training the ASR encoder with the ground truth text encoder by applying the triplet loss function further comprises tying the first embeddings and the second embeddings to reduce a difference therebetween.

13. The non-transitory machine-readable medium of claim 12, wherein the tying the first embeddings and the second embeddings by:

setting, as an anchor item, a first sample of the second embeddings directed to a first intent in the ASR transcription;

setting, as a positive item, a second sample embedding directed to a second intent substantially identical or similar to the first intent; and setting, as a negative item, a third sample embedding directed to a third intent substantially different from the first intent.

14. The non-transitory machine-readable medium of claim 13, wherein the tying the first embeddings and the second embeddings further comprises correcting the second embeddings closer to the second sample embedding and correcting the second embeddings farther from the third sample embedding.

15. The non-transitory machine-readable medium of claim 11, wherein the training the ASR encoder with the ground truth text encoder by further comprise training the ASR encoder with the ground truth text encoder by sequentially applying, with respect to the ASR transcription, combined loss functions including the triplet loss function, the classification loss function, and a Kullback-Leibler divergence loss function.

16. A method, comprising:
receiving, by a processing system including a processor, a manual transcription at a ground truth text encoder;
receiving, by the processing system, an automatic speech recognition (ASR) transcription at an ASR encoder;
generating, by the processing system, a natural language processing model by training the ASR encoder to learn from the ground truth text encoder, resulting in a trained natural language processing model, wherein the training the ASR encoder further comprises:
using a triplet loss function, correcting second embeddings of the ASR transcription to reduce a difference to a first embeddings of the manual transcription;
determining a first predicted intent probability distribution of the manual transcription;
based on the corrected second embeddings, determining a a second predicted intent probability distribution of the ASR transcription;
determining a classification loss indicative of a difference between the second predicted intent probability distribution and an actual intent class label of the ASR transcription;
determining a Kullback-Leibler divergence loss between an actual intent class label of the manual transcription and the actual intent class label of the ASR transcription, in connection with the first predicted intent probability distribution and the second predicted intent probability distribution; and
based on the determined Kullback-Leibler divergence loss, correcting a gap between the actual intent class label of the manual transcription and the actual intent class label of the ASR transcription; and
receiving, by the processing system, an ASR utterance; and
generating, by the processing system, a predicted semantic label corresponding to an intent associated with the ASR utterance via the trained ASR encoder.

17. The method of claim 16, wherein:
the receiving the ASR utterance further comprises receiving no manual transcription input; and
the generating the predicted semantic label further comprises generating the predicted semantic label corresponding to the intent by using the trained natural language processing model.

18. The method of claim 16, wherein the correcting the second embeddings of the ASR transcription further comprising:
based on a resulting value of the triplet loss function, tying first embeddings of the manual transcription to second embeddings of the ASR transcription by correcting the second embeddings closer to the first embeddings.

19. The method of claim 18, wherein the training the ASR encoder to learn from the ground truth text encoder further comprises setting to fix a weight of the ground truth text encoder during a training phase and during an inference phase, the ASR utterance is provided to the ASR encoder.

20. The method of claim 19, wherein the training the ASR encoder to learn from the ground truth text encoder further comprises sequentially applying combined loss functions including the triplet loss function, a classification loss function, and a Kullback-Leibler divergence loss function.

* * * * *